US008967196B2

United States Patent
Ha et al.

(10) Patent No.: US 8,967,196 B2
(45) Date of Patent: Mar. 3, 2015

(54) VALVE ASSEMBLY WITH VALVE POSITION INDICATOR

(75) Inventors: Khang Pham Ngoc Ha, San Diego, CA (US); Cody Charles Howarth, La Mesa, CA (US)

(73) Assignee: Solar Turbines Incorporated, San Diego, CA (US)

( * ) Notice: Subject to any disclaimer, the term of this patent is extended or adjusted under 35 U.S.C. 154(b) by 351 days.

(21) Appl. No.: 13/537,702

(22) Filed: Jun. 29, 2012

(65) Prior Publication Data

US 2014/0000732 A1    Jan. 2, 2014

(51) Int. Cl.
*F16K 37/00*    (2006.01)

(52) U.S. Cl.
USPC ..................... 137/554; 251/129.12

(58) Field of Classification Search
CPC ..... F16K 31/041; F16K 31/042; F16K 37/00; F16K 37/0025; F16K 37/0033; F16K 37/0041
USPC ..................... 137/554; 251/129.12
See application file for complete search history.

(56) References Cited

U.S. PATENT DOCUMENTS

| 3,522,596 | A | * | 8/1970 | Fowler et al. ............... 137/554 |
| 3,616,884 | A | * | 11/1971 | Balz ........................ 251/129.12 |
| 3,680,831 | A | * | 8/1972 | Fujiwara ................... 251/129.12 |
| 3,700,085 | A | * | 10/1972 | Balz ........................ 251/129.12 |
| 3,870,274 | A | * | 3/1975 | Broe ........................ 251/129.12 |
| 4,327,768 | A | | 5/1982 | Behle |
| 4,407,326 | A | * | 10/1983 | Wilhelm ................... 251/129.12 |
| 4,411,288 | A | | 10/1983 | Gain, Jr. |
| 4,518,008 | A | * | 5/1985 | Fenster et al. ................ 137/554 |
| 4,650,154 | A | * | 3/1987 | Pobelle ........................ 137/554 |
| 5,178,187 | A | | 1/1993 | Raymond, Jr. et al. |
| 5,518,028 | A | * | 5/1996 | Walker .......................... 137/554 |
| 5,579,800 | A | * | 12/1996 | Walker .......................... 137/554 |
| 5,623,963 | A | * | 4/1997 | Stommes et al. ............. 137/554 |
| 5,806,559 | A | | 9/1998 | Takasaka |
| 6,135,147 | A | * | 10/2000 | Peters et al. .................. 137/554 |
| 6,145,537 | A | | 11/2000 | McCutcheon |
| 6,267,139 | B1 | * | 7/2001 | Miklo et al. .................. 137/554 |
| 6,481,459 | B2 | | 11/2002 | Fukano et al. |
| 6,820,647 | B1 | * | 11/2004 | Grecco et al. ................. 137/554 |
| 6,899,129 | B2 | | 5/2005 | Jannotta |
| 6,945,509 | B2 | * | 9/2005 | Royse .......................... 137/554 |
| 7,784,490 | B1 | * | 8/2010 | Stewart et al. ................ 137/554 |
| 2002/0007820 | A1 | | 1/2002 | Davies et al. |
| 2011/0000287 | A1 | * | 1/2011 | Bacic ........................ 73/112.01 |

* cited by examiner

*Primary Examiner* — John Rivell
(74) *Attorney, Agent, or Firm* — Finnegan, Henderson, Farabow, Garrett & Dunner, LLP

(57) ABSTRACT

A valve assembly may include a valve disposed in a flow path and an actuator disposed above the valve. The actuator may be configured to actuate the valve to move between an open position and a closed position. The valve may also include a rocking member disposed above the actuator and configured to move with the valve. The valve may also include a pair of first and second position sensors disposed above and parallel to the actuator. The pair of first and second position sensors may be configured to detect a position of the rocking member. The position of the rocking member may be indicative of a position of the valve.

16 Claims, 3 Drawing Sheets

VALVE ASSEMBLY WITH VALVE POSITION INDICATOR

TECHNICAL FIELD

The present disclosure relates generally to a valve assembly and, more particularly, to a shutoff valve assembly with a valve position indicator.

BACKGROUND

A fuel supply system for a gas turbine typically includes a fuel shutoff valve to interrupt fuel supply to the combustion chamber of the gas turbine. A fuel supply system for certain gas turbines is provided in a compact fuel module, which constitutes a complete fuel system from fuel inlet to the fuel gas manifold of the combustion chamber. Certain safety standards, such as ATEX (ATmosphere EXplosibles) and CSA (Canadian Standards Association) standards, require installation of shutoff valves on liquid fuel supply lines with open/closed valve position indicators.

U.S. Pat. No. 6,481,459 issued to Fukano et al. ("the '459 patent") discloses an example of a valve assembly with an indicator section for indicating an ON/OFF state of the valve. A two-way valve has a diaphragm for opening and closing a fluid passage. An indicator of the indicator section, provided in the upper part of the two-way valve, is connected to the diaphragm via two rods so that the indicator is displaced in unison with the diaphragm. Displacement of these rods is directly transmitted to the indicator section to indicate whether the two-way valve is in the ON state where the fluid passage is opened or in the OFF state where the fluid passage is closed.

SUMMARY

According one exemplary aspect, the present disclosure is directed to a valve assembly. The valve assembly may include a valve disposed in a flow path and an actuator disposed above the valve. The actuator may be configured to actuate the valve to move between an open position and a closed position. The valve may also include a rocking member disposed above the actuator and configured to move with the valve. The valve may also include a pair of first and second position sensors disposed above and parallel to the actuator. The pair of first and second position sensors may be configured to detect a position of the rocking member. The position of the rocking member may be indicative of a position of the valve.

In another exemplary aspect of the present disclosure, a valve assembly may include a valve disposed in a flow path and an actuator disposed above the valve. The actuator may be configured to actuate the valve to move between an open position and a closed position. The valve assembly may also include an V-shaped rocking member comprising a first arm and a second arm substantially perpendicular to the first arm. The rocking member may be disposed above the actuator and configured to move with the valve. The valve assembly may further include a pair of first and second position sensors configured to detect a position of the rocking member. The rocking member may be configured to move between a first position in which the first arm is brought within a sensing range of the first position sensor to activate the first position sensor and a second position in which the second arm is brought within a sensing range of the second position sensor to activate the second position sensor.

Another exemplary aspect of the present disclosure is directed to a fuel module for supplying fuel to a combustor. The fuel module may include a fuel inlet, a fuel outlet, and a fuel flow path between the fuel inlet and the fuel outlet. The fuel module may also include a shutoff valve assembly disposed in the fuel flow path. The valve assembly may include a valve disposed in the fuel flow path and an actuator disposed above the valve. The actuator may be configured to actuate the valve to move between an open position and a closed position. The valve assembly may also include a rocking member disposed above the actuator and configured to move with the valve. The valve assembly may further include a pair of first and second position sensors disposed above and perpendicular to an axis of rotation of the valve. The pair of first and second position sensors may be configured to detect a position of the rocking member. The position of the rocking member may be indicative of a position of the valve.

DETAILED DESCRIPTION

Figure 1:
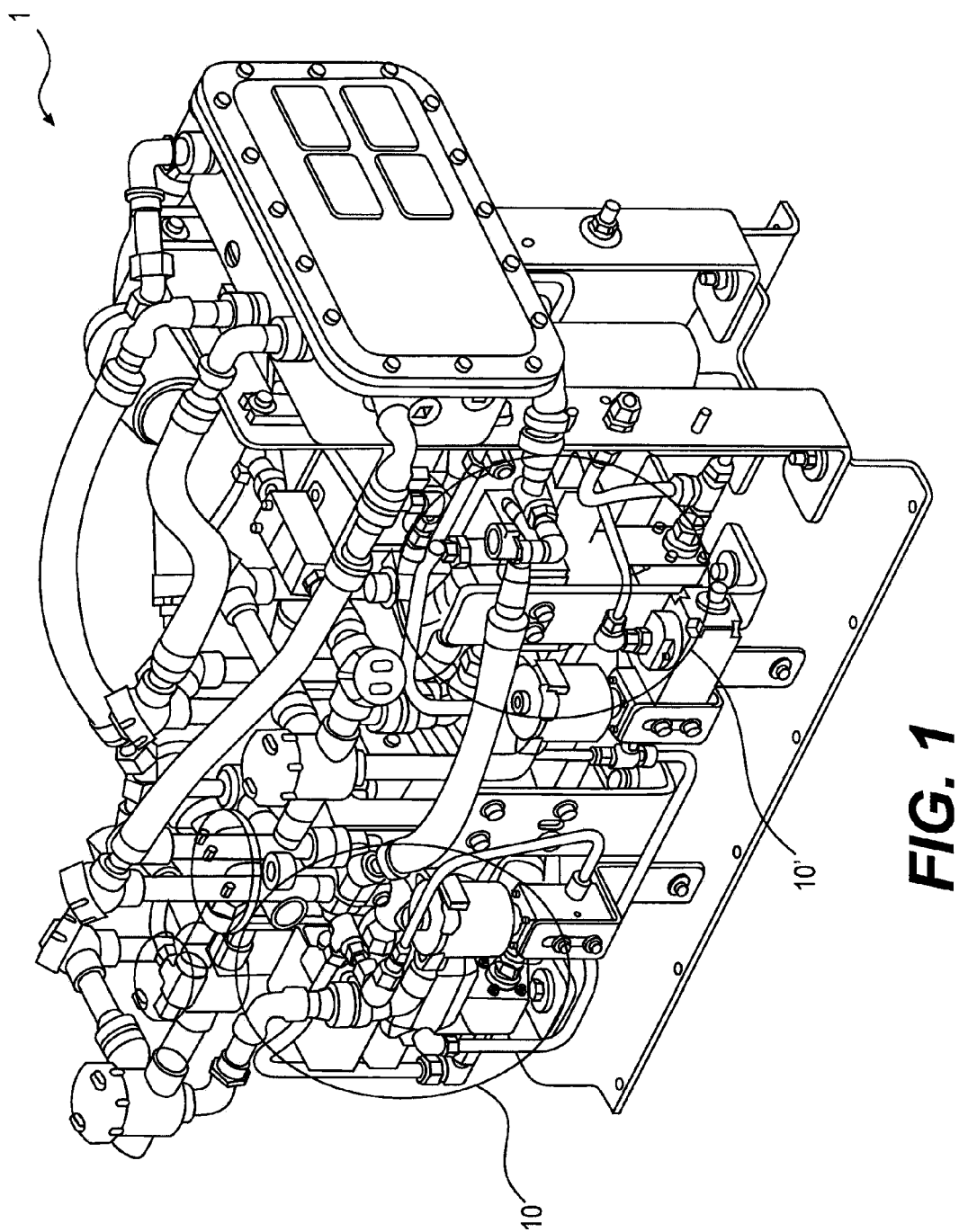
FIG. 1 is a perspective view of an exemplary fuel module in accordance with the present disclosure.

FIG. 1 illustrates an exemplary fuel system 1, provided as a compact, modular unit, for supplying fuel to a combustion system, such as, for example, a gas turbine. Fuel system 1, assembled as a single-lift module, represents a complete fuel system disposed between the package fuel inlet and the engine fuel supply manifold. Fuel system 1 may include various control valves, including two shutoff valve assemblies 10, 10' for automatically shutting off liquid fuel flow, and associated hardware and instrumentations. While fuel system 1 of the present disclosure is depicted as having two shutoff valve assemblies 10 and 10', fuel system 1 may have only one shutoff valve assembly or more than two shutoff valve assemblies depending on, for example, the capacity of the combustion system to which fuel system 1 supplies fuel.

As shown in FIG. 1, fuel system 1 is generally a compact unit with limited space. Therefore, it may be desirable to design a shutoff valve assembly as small as possible to keep the fuel module compact and/or to improve wire and tube routing within fuel system 1. This is particularly applicable when existing installations are to be retrofitted with a new valve assembly that complies with the requirement of valve position indicator.

Figure 3:
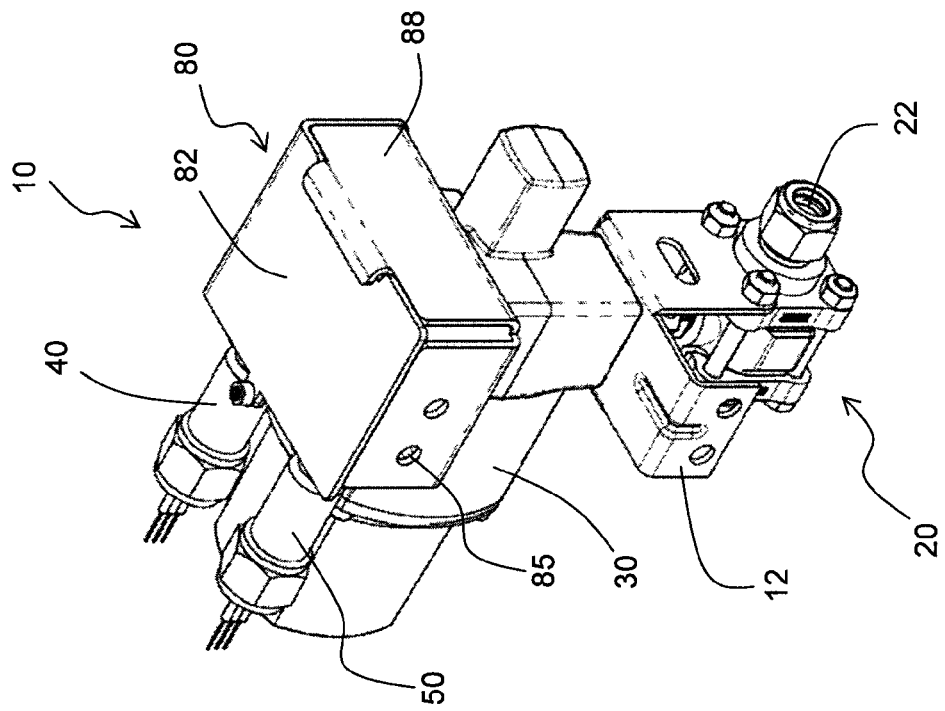
FIG. 3 is another perspective view of the valve assembly of FIG. 2 with the outer housing closed with the lid portion.
Figure 2:
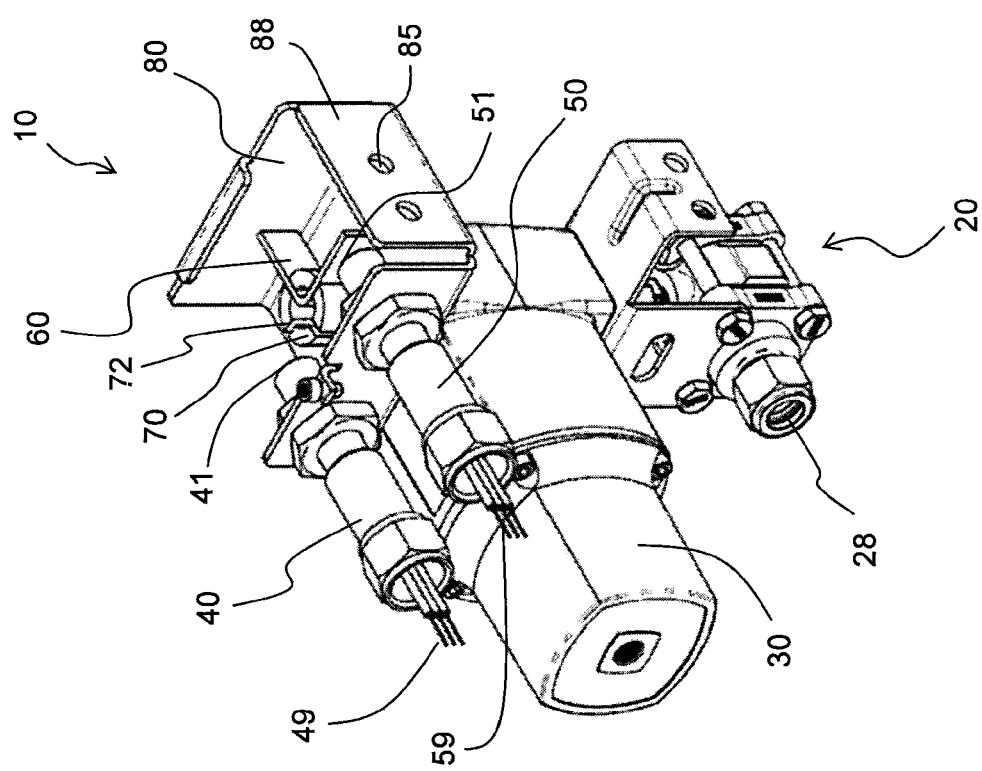
FIG. 2 is a perspective view of an exemplary valve assembly with a lid portion of an outer housing removed, in accordance with the present disclosure.

FIGS. 2 and 3 illustrate an exemplary shutoff valve assembly 10. Valve assembly 10 may include a valve body 20, an actuator 30 disposed above the valve body 20, and a pair of position sensors 40, 50 associated with a rocking member 60. As will be described in more detail, the pair of position sensors 40, 50 and rocking member 60 may constitute a valve position indicator for indicating an open or closed position of the valve. While the valve position indicator of the present disclosure is described in connection with a shutoff valve, it should be understood that the valve position indicator according to the present disclosure may be used with or applied to any other type of valve.

Valve assembly 10 may be provided with a mounting bracket 12 having one or more holes through which screws or pins can pass to mount valve assembly 10 to a corresponding bracket of fuel system 1, as shown in FIG. 1. An additional or alternative mounting bracket may be provided as a part of a housing 80 that substantially encloses sensing areas 41, 51 of the first and second position sensors 40, 50 and the rocking member 60.

Figure 4:
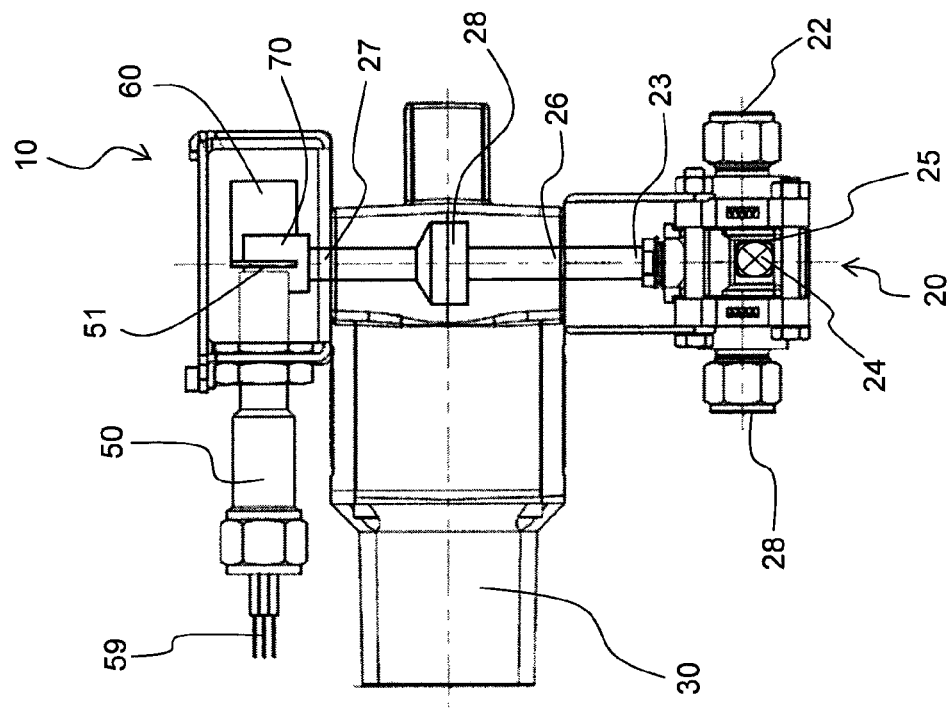
FIG. 4 is a cross-sectional view of the valve assembly of FIGS. 2 and 3.

With reference to FIG. 4, valve body 20 may include an inlet 22, an outlet 28, and a flow path 25 defined therebetween. A valve 24 is disposed in flow path 25 to selectively open and close flow path 25. Valve 24 may be a ball valve configured to be operated between either a fully open or fully closed position. Alternatively, valve 24 can be a globe valve, a butterfly valve, a disk valve, or any other suitable valve. Valve 24 may be fixedly connected to a first end portion 23 of a valve stem 26. Valve stem 26 may extend through and be coupled with an actuator 30 to cause movement of valve stem 26 to open and close valve 24. A second end portion 27 of valve stem 26 may extend further out of actuator 30 and be connected to an adapter 70 configured to accommodate rocking member 60. Although valve stem 26 is shown in FIG. 4 as a single piece extending from valve 24 to adapter 70, it is contemplated that valve stem 26 may constitute two or more pieces interconnected together through one or more suitable connectors.

Actuator 30 may be a pneumatically operated, spring-return actuator, which uses air or other suitable fluid supplied from a controller. Alternatively, actuator 30 may be hydraulically and/or electrically powered to supply force to cause movement of valve stem 26. In one exemplary embodiment, actuator 30 may include a rack (not shown) configured to move axially along the actuator body. The rack may include gear teeth configured to engage a pinion gear 28 fixedly attached to valve stem 26. The combination of a rack and pinion gear 28 may translate linear motion of the rack to rotary motion of valve stem 26 to open and close the valve. For example, when a ball valve is used in valve assembly 10, actuator 30 may be configured to cause quarter-turn of valve stem 26 (i.e., 90° actuation) to open and close the ball valve.

As briefly mentioned above, valve assembly 10 may include a valve position indicator comprising rocking member 60 and a pair of position sensors 40 and 50 configured to detect the position of rocking member 60. Rocking member 60 may be mechanically coupled to valve stem 26 through adapter 70, such that the position of rocking member 60 may be used to indirectly indicate the position of the valve. Adapter 70 may be integrally formed with or fixedly connected to second end portion 27 of valve stem 26. In the disclosed exemplary embodiment, rocking member 60 forms a V-shaped member having first and second arms 62 and 68 extending perpendicularly to one another, and adapter 70 may include a cylindrical ring having at least two slits 72 configured to receive V-shaped rocking member 60, as shown in, for example, FIG. 2. In some exemplary embodiments, first and second arms 62 and 68 may form greater or less than 90° therebetween.

First and second position sensors 40 and 50 may be elongated limit switches positioned substantially parallel to one another and to actuator 30 and substantially perpendicular to valve stem 26. While sensors 40 and 50 are depicted in FIGS. 2 and 3 as having a circular shape, it should be understood that sensors 40 and 50 may have any other shape, such as, for example, a square, rectangular, or triangular shape. The first and second position sensors 40 and 50 may be configured to activate and deactivate as the position of rocking member 60 changes. Each of first and second position sensors 40 and 50 may include a magnet near a sensing end 41 and 51, which reacts to ferrous metal or magnet brought into a close proximity within its sensing range. Accordingly, rocking member 60 may be made of or at least include ferrous or magnetic material in its portion that comes within a sensing range of sensing ends 41 and 51.

A variety of other types of sensors may be used in position sensors 40 and 50 as an alternative or in addition to the magnet. For example, any type of proximity sensors, such as, for example, capacitive or inductive proximity sensors, infrared sensors, and optical sensors, may be used as position sensors 40 and 50. Further, a mechanical device, such as a touch button disposed on the sensing end 41 and 51 of the position sensors 40 and 50, can be used.

Figure 5:
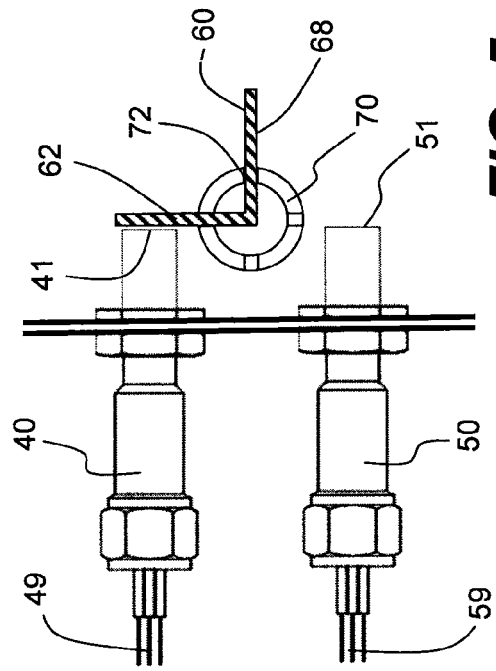
FIGS. 5 and 6 are schematic top views of the valve assembly shown in FIGS. 2 and 3, illustrating the position indicator in an open position and closed position, respectively.
Figure 6:
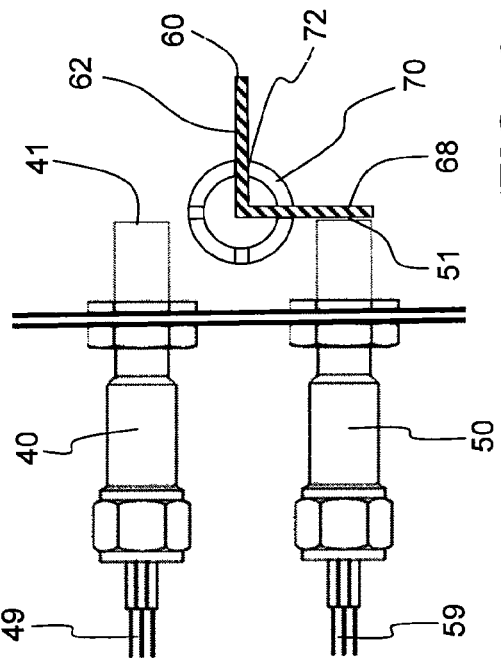

FIGS. 5 and 6 schematically illustrate an exemplary operation of the valve position indicator. Rocking member 60, seated onto adaptor 70, turns with valve stem 26 between a first position in which first arm 62 is brought within the sensing range of first position sensor 40 (see FIG. 5) and a second position in which second arm 68 is brought within the sensing range of second position sensor 50 (see FIG. 6). In the first position, first position sensor 40 may be activated due to its magnetic reaction with first arm 62, while second position sensor is in a deactivated state. At this time, an electrical signal may be transmitted to a controller via wires 49 to indicate that the valve is in an open position. When rocking member 60 turns from the first position to the second position, first position sensor 40 is deactivated, and second position sensor 50 is activated. An electronic signal indicating that the valve is in a closed state may be transmitted to the controller via wires 59.

Housing 80 may be provided to substantially enclose sensing areas of the valve position indicator, which include at least sensing ends 41 and 51 and rocking member 60, thereby preventing foreign substances from affecting the performance of position sensors 40 and 50. Further, by enclosing rocking member 60, housing 80 may protect personnel working with valve assembly 10 from a potential pinch hazard arising from rotating rocking member 60. In one exemplary embodiment, housing 80 may include a base portion 88 and a lid portion 82, as best shown in FIGS. 2 and 3. A wall of the base portion 88 may be used to fix valve assembly 10 to a support bracket of fuel system 1. For example, base portion 88 may include one or more holes 85 that can be used to connect to the support bracket. The pair of position sensors 40 and 50 may also be structurally supported by base portion 88 via suitable connectors, such as, for example, lug nuts.

Industrial Applicability

The disclosed valve assembly may be applicable to shut off liquid fuel flow in a fuel system that supplies fuel to a combustion system, such as, for example, a gas turbine. While certain safety standards require installation of one or more shutoff valves with an open/closed valve position indicator on liquid fuel supply lines, some fuel systems are provided as a compact, modular unit, which may have very limited internal space to accommodate a valve assembly that complies with the safety requirements.

The disclosed valve assembly with a pair of position sensors positioned above and substantially parallel to an actuator of the valve may allow the valve assembly to be short and compact, which may not only enable fuel system 1 to be compact but also improve wire and tube routing within fuel system. For example, as best shown in FIGS. 2 and 3, first and second position sensors 40 and 50, each formed of a tubular structure with a relatively small cross-sectional area, are positioned horizontally above actuator 30 substantially in parallel to one another and to a longitudinal axis of actuator 30.

Because the pair of first and second position sensors 40 and 50 and actuator 30 are aligned in parallel to one another, position sensors 40 and 50 can be placed in close proximity to actuator 30. This allows first and second position sensors 40 and 50 to have a low profile above actuator 30, which in turn allows valve assembly 10 to be provided in a compact fuel module as a short and compact unit. The valve assembly of the present disclosure may be particularly applicable when existing installations of fuel systems are to be retrofitted or replaced with a new valve assembly that complies with the safety requirements. For example, the valve assembly of the present disclosure may permit retrofitting valve assembly 10 to existing valve assemblies without any significant rearrangement of other components inside a fuel module or restructuring of the fuel module.

The compact nature of the disclosed valve assembly can also be applied to any fuel system of a combustion system, regardless of whether the fuel system is provided in a space-limited modular unit.

Further, the valve assembly of the present disclosure can be applied to any valve system having or requiring a valve position indicator.

It will be apparent to those skilled in the art that various modifications and variations can be made to the disclosed valve assembly. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A valve assembly comprising:
   a valve disposed in a flow path;
   an actuator disposed above the valve and configured to actuate the valve to move between an open position and a closed position;
   a rocking member disposed above the actuator and configured to move with the valve; and
   a pair of first and second position sensors disposed above and parallel to the actuator and configured to detect a position of the rocking member,
   wherein the position of the rocking member is indicative of a position of the valve, and wherein the rocking member is configured to move between a first position to activate the first position sensor and a second position to activate the second position sensor, and wherein the rocking member comprises an V-shaped rocking member having a first arm and a second arm substantially perpendicular to the first arm, wherein the V-shaped rocking member is configured to move between the first position in which the first arm is brought within a sensing range of the first position sensor and the second position in which the second arm is brought within a sensing range of the second position sensor.

2. The valve assembly of claim 1, further comprising a valve stem connecting between the valve and the actuator to move the valve between the open position and the closed position, wherein the rocking member is configured to rotate with the valve stem.

3. The valve assembly of claim 2, further comprising an adapter configured to connect between the valve stem and the rocking member, wherein the adapter comprises a cylindrical ring coupled to the valve stem and a plurality of slits configured to receive the rocking member.

4. The valve assembly of claim 2, wherein the pair of first and second position sensors are disposed substantially perpendicular to a longitudinal axis of the valve stem.

5. The valve assembly of claim 1, further comprising a housing substantially enclosing the rocking member and sensing portions of the first and second position sensors.

6. The valve assembly of claim 1, wherein each of the first and second position sensors comprises a limit switch.

7. The valve assembly of claim 1, wherein the valve comprises a ball valve, and the actuator comprises a quarter-turn actuator to rotate the valve between the open position and the closed position.

8. A valve assembly comprising:
   a valve disposed in a flow path;
   an actuator disposed above the valve and configured to actuate the valve to move between an open position and a closed position;
   an V-shaped rocking member comprising a first arm and a second arm substantially perpendicular to the first arm, the rocking member being disposed above the actuator and configured to move with the valve; and
   a pair of first and second position sensors configured to detect a position of the rocking member,
   wherein the rocking member is configured to move between a first position in which the first arm is brought within a sensing range of the first position sensor to activate the first position sensor and a second position in which the second arm is brought within a sensing range of the second position sensor to activate the second position sensor.

9. The valve assembly of claim 8, further comprising a valve stem connecting between the valve and the actuator to move the valve between the open position and the closed position, wherein the rocking member is configured to rotate with the valve stem.

10. The valve assembly of claim 9, wherein the pair of first and second position sensors are disposed substantially perpendicular to a longitudinal axis of the valve stem.

11. The valve assembly of claim 8, wherein each of the first and second position sensors comprises a limit switch.

12. The valve assembly of claim 8, further comprising a housing substantially enclosing the rocking member and sensing portions of the first and second position sensors.

13. A fuel module for supplying fuel to a combustor, comprising:
   a fuel inlet;
   a fuel outlet;
   a fuel flow path between the fuel inlet and the fuel outlet;
   a shutoff valve assembly disposed in the fuel flow path, the valve assembly comprising:
      a valve disposed in the fuel flow path;
      an actuator disposed above the valve and configured to actuate the valve to move between an open position and a closed position;
      a rocking member disposed above the actuator and configured to move with the valve; and
      a pair of first and second position sensors disposed above and perpendicular to an axis of rotation of the valve and configured to detect a position of the rocking member, wherein the position of the rocking member is indicative of a position of the valve, wherein the rocking member is configured to move between a first position to activate the first position sensor and a second position to activate the second position sensor, and wherein the rocking member comprises an V-shaped rocking member having a first arm and a second arm substantially perpendicular to the first arm, wherein the V-shaped rocking member is configured to move between the first position in which the first arm is brought within a sensing range of the first position sensor and the second position in which the second arm is brought within a sensing range of the second position sensor.

14. The fuel module of claim 13, further comprising a valve stem connecting between the valve and the rocking member.

15. The fuel module of claim 13, further comprising a housing substantially enclosing the rocking member and sensing portions of the first and second position sensors.

16. The fuel module of claim 13, wherein each of the first and second position censors comprises a limit switch.

* * * * *

UNITED STATES PATENT AND TRADEMARK OFFICE
CERTIFICATE OF CORRECTION

| | | |
|---|---|---|
| PATENT NO. | : 8,967,196 B2 | Page 1 of 1 |
| APPLICATION NO. | : 13/537702 | |
| DATED | : March 3, 2015 | |
| INVENTOR(S) | : Ha et al. | |

It is certified that error appears in the above-identified patent and that said Letters Patent is hereby corrected as shown below:

IN THE SPECIFICATION

Column 4, line 48, delete "Industrial Applicability" and insert -- INDUSTRIAL APPLICABILITY --.

Signed and Sealed this
Second Day of February, 2016

Michelle K. Lee
*Director of the United States Patent and Trademark Office*